United States Patent
Schram et al.

(10) Patent No.: US 9,651,771 B2
(45) Date of Patent: *May 16, 2017

(54) MANUFACTURING METHOD FOR AN ELECTROWETTING DEVICE

(71) Applicants: SEKISUI CHEMICAL CO., LTD, Osaka (JP); Amazon Technologies, Inc., Seattle, WA (US)

(72) Inventors: Ivar Schram, Weert (NL); Akira Nakasuga, Osaka (JP); Bokke Johannes Feenstra, Nuenen (NL)

(73) Assignee: Amazon Technologies, Inc., Seattle, WA (US)

( * ) Notice: Subject to any disclaimer, the term of this patent is extended or adjusted under 35 U.S.C. 154(b) by 259 days.

This patent is subject to a terminal disclaimer.

(21) Appl. No.: 14/204,081

(22) Filed: Mar. 11, 2014

(65) Prior Publication Data
US 2014/0192396 A1 Jul. 10, 2014

Related U.S. Application Data

(63) Continuation of application No. 13/662,666, filed on Oct. 29, 2012, now Pat. No. 8,696,847, which is a
(Continued)

(30) Foreign Application Priority Data

Apr. 29, 2010 (GB) ................................. 1007199.1
Sep. 24, 2010 (JP) ................................. 2010-214143
Sep. 24, 2010 (JP) ................................. 2010-214144

(51) Int. Cl.
*G02B 26/00* (2006.01)

(52) U.S. Cl.
CPC ......... *G02B 26/005* (2013.01); *G02B 26/004* (2013.01); *Y10T 29/49826* (2015.01)

(58) Field of Classification Search
None
See application file for complete search history.

(56) References Cited

U.S. PATENT DOCUMENTS 7,980,909 B2 * 7/2011 Hayes .................. G02B 26/005
359/253
8,520,285 B2 * 8/2013 Fike, III ................ B32B 37/003
156/145
(Continued)

FOREIGN PATENT DOCUMENTS

JP 2008170586 A 7/2008
JP 2010-011301 1/2010
(Continued)

OTHER PUBLICATIONS

Kamiya, H., et al., "56.3: Development of One Drop Fill Technology for AM-LCDs," SID 01 Digest, pp. 1354-1357, 2001 (ISSN/0001-0966X/01/3201-1354).
(Continued)

*Primary Examiner* — Jeff Aftergut
(74) *Attorney, Agent, or Firm* — EIP US LLP

(57) ABSTRACT

A method of providing a layer of a first fluid and a layer of a second fluid on a first area of a support plate of an electrowetting device includes providing an emulsion of dispersed first fluid and continuous second fluid, the emulsion including an amount of the second fluid for forming the layer of the second fluid.

26 Claims, 3 Drawing Sheets

Related U.S. Application Data continuation of application No. PCT/EP2011/056776, filed on Apr. 28, 2011.

(56) References Cited

U.S. PATENT DOCUMENTS

| | | |
|---|---|---|
| 2006/0071357 A1 | 4/2006 | Pilon et al. |
| 2006/0102477 A1 | 5/2006 | Vann et al. |
| 2007/0187242 A1 | 8/2007 | Nair et al. |
| 2007/0189998 A1 | 8/2007 | Nair et al. |
| 2009/0040591 A1 | 2/2009 | Cheng et al. |

FOREIGN PATENT DOCUMENTS

| | | |
|---|---|---|
| TW | 200946956 A | 11/2009 |
| TW | 200947093 A | 11/2009 |
| WO | 03071346 A1 | 1/2003 |
| WO | 2004098797 A2 | 11/2004 |
| WO | 2005098797 A2 | 10/2005 |
| WO | 2008125644 A1 | 10/2008 |
| WO | 2009065909 A1 | 5/2009 |
| WO | 2009106546 A1 | 9/2009 |

OTHER PUBLICATIONS

Zhou, K., et al., "A full description of a simple and scalable fabrication process for electrowetting displays," J. Micromech. Microeng., 19 (2009) 065029 (12pp).

English Language Abstract of Japanese Patent Application 2008170586 filed Jul. 24, 2008.

* cited by examiner

MANUFACTURING METHOD FOR AN ELECTROWETTING DEVICE

CROSS REFERENCE TO RELATED APPLICATIONS

This application claims the benefit of the following applications under U.S.C. §120: (1) U.S. Ser. No. 13/662,666 filed Oct. 29, 2012, (2) PCT/EP2011/056776 filed Apr. 28, 2011.

BACKGROUND

A method of providing a layer of non-polar (also called hereafter "hydrophobic") liquid on a surface of a substrate, particularly suitable for making electrowetting displays, is known. The surface is initially covered by a layer of polar or conductive (also called hereafter "hydrophilic") liquid. A dispenser has its opening positioned inside the polar or conductive layer and above the surface. Non-polar liquid is fed into the dispenser and a drop of non-polar liquid is formed between the opening and the surface. The surface includes first hydrophobic areas surrounded by second hydrophilic areas. When the dispenser moves over the surface, the drop of non-polar liquid is dragged over the first and second areas and replaces the polar or conductive liquid on the first areas by a layer of non-polar liquid while leaving the polar or conductive liquid on the second areas.

A disadvantage of the known method is that it requires process equipment specifically developed for filling electrowetting devices. Another disadvantage of this method is that the method is relatively slow and is difficult to scale up to large size substrates. Another disadvantage of this method is poor productivity caused by the fact that a cover glass is attached in a liquid after formation of the hydrophobic liquid layers.

Another method is known in which a container having a liquid inlet and a liquid outlet is prepared; first and second liquids, one having conductivity (hydrophilicity) and the other having non-conductivity (hydrophobicity) are prepared; the first liquid is fed into the container and then the second liquid is fed thereinto; and thereby an interface is formed between the first and second liquids. In this method, however, the hydrophobic liquid coagulates at one portion to cause unevenness.

It is desirable to provide a method that allows use of existing equipment for filling or provide a method that is much faster or significantly more scalable than known methods.

DETAILED DESCRIPTION

Figure 1:
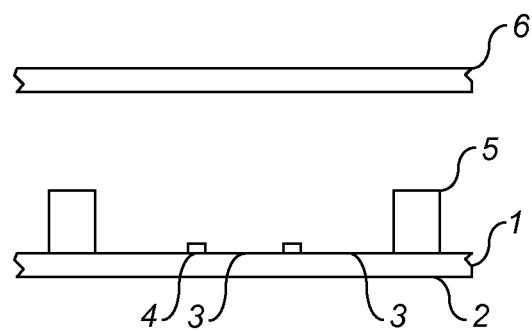
FIG. 1 shows a cross-section of a support plate.

The entire contents of the following patent documents are incorporated by reference herein:

1. U.S. Ser. No. 13/662,666 filed Oct. 29, 2012
2. GB 1007199.1 filed Apr. 29, 2010
3. JP 2010-214144 filed Sep. 24, 2010
4. JP 2010-214143 filed Sep. 24, 2010
5. PCT/EP2011/056776 filed Apr. 28, 2011

Embodiments described herein relate to improvements in relation to a method of manufacturing an electrowetting device.

Before describing detailed embodiments referencing the Figures, embodiments will be described in summary form.

In accordance with an embodiment, there is provided a method of providing a layer of a first fluid and a layer of a second fluid on a first area of a support plate of an electrowetting device, the first fluid and the second fluid being immiscible and the first area having a higher wettability for the first fluid than for the second fluid, comprising the steps of providing an emulsion of dispersed first fluid and continuous second fluid;

bringing the first area and the emulsion in contact;

the dispersed first fluid coalescing to form a layer of first fluid on the first area.

When the emulsion is brought into contact with the first area, droplets of the first fluid dispersed in the emulsion will be attracted to the first area because of its high wettability for the first fluid. The movement of the first fluid towards the first area will cause a concentration gradient in the emulsion, driving more droplets of the first fluid towards the first area. The droplets will coalesce on the first area, forming a first fluid layer adjoining the first area. The emulsion, substantially depleted from the first fluid, will form a second fluid layer adjoining the first fluid layer.

The first fluid may be an alkane, a decane or a silicon oil or a combination of such fluids; the second fluid may be an electrolyte, such as a water or a salt solution such as a solution of KCl in a mixture of water. The method allows a faster filling of a support plate than known methods. It does not require the first fluid to be deposited onto the support plate through a layer of second fluid, as used in some known methods, thereby simplifying the manufacture. The method according to the embodiment can make use of known process equipment, such as a one-drop-filling method used in the manufacture of liquid-crystal displays.

In an embodiment of the method, the support plate includes one or more first areas surrounded by one or more second areas, the second areas having a higher wettability for the second fluid than for the first fluid.

The droplets of first fluid will be attracted by the first area and be repelled by the second area. Hence, a layer of first fluid will form that has the extent of the first area. The contact of the emulsion with the pattern of first areas surrounded by second areas results in each first area being covered by a layer of first fluid and the second areas being adjoined by the second fluid.

The method may include the step of dosing the emulsion on the support plate using one or more dispensers. The method may use a single dispenser for depositing the emulsion on the support plate. It may also use a plurality of dispensers, each dispenser filling one or more first areas at a time. The dispensers may be moved over a stationary support plate or the support plate is moved below stationary dispensers or both the dispensers and the support plate may move.

In an embodiment of the method, the emulsion is below the first area of the support plate when the first fluid coalesces. When the first fluid is lighter than the second fluid, gravitational forces will assist the movement of the droplets of first fluid upwards to the support plate, thereby accelerating the formation of the layer of first fluid. This orientation may be maintained during at least part of the time the first fluid takes to coalesce. In an embodiment the emulsion is deposited on a first support plate from above and, after a second support plate closes the space filled with emulsion, the orientation of the arrangement is rotated such that the emulsion is below the first support plate. Thus, the method may include rotating an orientation of the support plates after sealing of the second support plate to the first support plate.

The step of coalescing of the first fluid may be carried out after sealing of the support plate to a second support plate. After sealing a well-defined amount of emulsion is enclosed in the space between the two support plates, thereby achieving the formation of a well-defined layer of first fluid on the support plate in addition to a well-defined layer of second fluid.

In an embodiment, the step of coalescing of the first fluid is accelerated or catalyzed by centrifuging the electrowetting device, and thus the support plates, after the second support plate is sealed on the first support plate. The centrifugal forces that occur during the rotation will result in a faster coalescing of the first fluid on the first area of the support plate, and additionally thereby promoting more efficient and faster segregation of the first fluid and the second fluid of the emulsion.

In a further embodiment of the method, the first fluid and/or the second fluid have a volatility selected to reduce or minimize evaporation of the first and/or second fluid during the method. For example, in a one-drop-filling method, the second support plate is sealed to the first support plate in a vacuum environment, to avoid having air bubbles enclosed. To make sure that the first fluid or second fluid are not substantially depleted during this step in the process, the fluids may have a low volatility.

An embodiment of the method includes the step of preparing the emulsion shortly before bringing the first support plate, including the first area and the emulsion in contact.

When the emulsion is prepared shortly before bringing it into contact with the first area, the emulsion need not have a long shelf life. The shorter shelf life of the emulsion itself most likely reduces the chances that during the life of the electrowetting device some parts of the first fluid leave the layer of first fluid and enter the second fluid. When the emulsion is prepared shortly before dosing, the first fluid and second fluid can be stored separately. The apparatus for dispensing the emulsion may include an extra stage, where the two fluids are mixed to form an emulsion. The extra stage may use, for example, ultra-sound or mechanical mixing or any of the other well-known methods to make an emulsion. The emulsion is subsequently dispensed on the support plate.

The method of preparing the emulsion shortly before contacting the emulsion and the first area, may include the steps of:

preparing the emulsion inside an apparatus for dispensing the emulsion on the first support plate, the emulsion being stable during a first period and dispensing the emulsion on the first support plate during the first period. Values of the first period may be 5, 15 and 30 minutes. The emulsion may be prepared in an emulsion stage that forms part of a dispensing device.

In one of the embodiments, the support plate includes a plurality of first areas and within each first area an electrode is arranged and the second fluid is an electrolyte, the coalescing of the first fluid can be controlled by applying a voltage between the emulsion and the electrode. By controlling the rate of coalescing of the first fluid one can control and improve the uniformity of the fill across the device.

When the second fluid is an electrolyte, a voltage applied between the emulsion and the electrode will increase the attraction between the second fluid and the area of the support plate where the electrode is arranged. Hence, the tendency of the first fluid to adhere to the first area is reduced and thereby the rate of droplets of first fluid moving towards the first area is reduced. The voltage level can be used to tune the rate of coalescing continuously.

When a first area is already covered by a layer of first fluid, the application of a voltage will create an electrical charge on the interface between the layer of first fluid and the layer of second fluid, which will reduce the coalescence of the first fluid. When the voltage is above a certain threshold value, the layer of first fluid on the first area will contract and expose part of the first area to the emulsion. In this situation, the coalescence on the exposed part will be strongly reduced and the coalescence on the contracted layer of first fluid will also be reduced, albeit less strongly.

The method of controlling the coalescence may include the step of measuring an amount of coalesced first fluid on the first area and determining the voltage in dependence on the amount. The measurement of the amount of first fluid may be made optically, for example by determining the absorption of the layer of first fluid in reflection or transmission. The measurement may also be made electrically, for example by measuring the capacitance between an electrode arranged in the first area and the second fluid. The measured value can be used to control locally or globally the deposition of the droplets of first fluids.

During the process air may be trapped on the support plate or in the emulsion. This air may be removed by applying ultrasound in a controlled manner to the first fluid and the second fluid. The ultrasound may be applied to the emulsion, i.e. before the separation in two fluid layers, or to the layers of first and second fluid, i.e. after the separation.

The stability of the two layers may be increased by adding a substance to the second fluid that increases the interfacial tension between the first and second fluid, potentially after the first fluid layer has been dosed to the first areas. When the substance is added to the emulsion before the separation, it will accelerate the separation process. The substance may be a salt, which may have the dual function of increasing the surface tension and increasing the electrical conductivity.

The method may include the steps of providing a second support plate and sealing the second support plate to the support plate, forming a space between the support plates including the first fluid and the second fluid.

The amount of emulsion provided on the one or more first areas may be substantially equal to a volume of said space. The space may be filled with first and second fluid before it is closed by sealing with the second support plate. The above mentioned method is suitable for providing a precise, predetermined amount of emulsion for filling said space. Alternatively, the space may be formed with an opening in the seal between the support plates or an opening in one of the support plates; the space is subsequently filled with emulsion through the opening; and the opening is closed.

An embodiment of the electrowetting device is an electrowetting display device.

A further embodiment relates to an emulsion for the manufacture of an electrowetting device, comprising a first fluid and a second, immiscible fluid, the first fluid being hydrophobic and the second fluid being hydrophilic, the first fluid being dispersed in the second fluid. The first fluid may include a coloring substance and/or the first fluid may be dispersed as droplets in the second fluid.

The ratio of first fluid and second fluid in the emulsion is adjusted in dependence on the specific application, for example the display parameters, including the pixel resolution and the cell gap distance between the first and second support plate, to achieve a pre-determined thickness of the layer of first fluid. The coloring substance may be any dye and/or pigment, such as an anthraquinone. A good chromaticity and light-shielding effect can be obtained when the amount of coloring substance is 1 M or less. The amount of coloring substance may be less than 0.3 M or 0.1 M. The amount may be more than 0.01 M.

The dispersed first fluid may have a droplet size between 0.05 micrometer and 10 micrometer and may have a CV (Coefficient of Variation) value of 10% or less. When the droplet size is larger than 0.05 micrometer, the adsorption on the first area is improved. When the droplet size is smaller than 10 micrometer, the uniformity of adsorption on the first area is improved. In an embodiment the lower limit is 1 micrometer and/or the upper limit is 5 micrometer.

The CV value is defined as $(\sigma/D_n) \times 100$, where $\sigma$ is the standard deviation of the particle size and $D_n$ the average particle size. A low CV value improves the uniformity of the coalescence on the first area. The standard deviation and the particle size may be measured with a microscope, e.g. by measuring 100 droplets or by dynamic light scattering with e.g. the ZETASIZER Nano Series Nano-ZS of Malvern Instruments Ltd.

The emulsion may be made using the following steps:

mixing the first fluid and a hydrophilic second fluid to form a mixed solution;

forming an emulsion of the mixed solution by dispersing the second fluid in the first fluid. The method of making the emulsion may include dissolving a coloring substance in a hydrophobic first fluid.

According to a further embodiment, the emulsion may comprise an additive for improving a stability of the dispersed first fluid. The emulsion may comprise a surfactant, which may be the additive; further additives may be added.

The above embodiments may be combined with further embodiments described below; features of such embodiments are similar to features described previously, for example, the first fluid may for example be a hydrophobic liquid, the second fluid may be for example a hydrophilic liquid, the first area may for example be a hydrophobic area, the space for example defines a cell, and a hydrophobic layer may for example be a hydrophobic interlayer. Further, the term electrowetting display may be used below to refer to an electrowetting display device.

According to a further embodiment, there is provided an emulsion comprising a surfactant, wherein the surfactant comprises a non-ionic surfactant including a compound having a hydrophobic segment and a compound having a hydrophilic segment, the difference between the SP value of the compound having a hydrophobic segment and the SP value of the compound having a hydrophilic segment being 4 or greater. "SP value" refers to a solubility parameter; see below.

This embodiment may provide an emulsion, for example an emulsion ink, for an electrowetting device that enables easy production of a high-quality electrowetting device.

This embodiment may also provide an electrowetting device produced by using the emulsion for an electrowetting device.

Studies have been performed for producing an electrowetting device by injecting a hydrophilic liquid and a hydrophobic liquid into a panel under a vacuum condition (a vacuum injection technique), and by drop-wise adding the liquids to one substrate and then bonding the other substrate thereto (a one-drop-fill technique). However, separate injection and drop-wise adding of the hydrophilic liquid and the hydrophobic liquid may cause a local difference in coagulation of the hydrophobic liquid, resulting in unevenness. Thus, studies have been performed for using an emulsion ink in which the hydrophobic liquid is dispersed in the hydrophilic liquid.

In the case of producing an electrowetting device by vacuum injection or one-drop-filling, the hydrophobic liquid in the emulsion is required to be stably dispersed in the hydrophilic liquid during the production and to be formed into a layer separated from the hydrophilic liquid after the production in order to prevent unevenness of the hydrophobic liquid. Here, it has been considered to blend a surfactant into the emulsion in order to adjust the dispersibility of the hydrophobic liquid in the emulsion to the extent that the hydrophobic liquid is stably dispersed during the production of the electrowetting device and it is separated as a layer after the production. However, a common surfactant gives insufficient dispersibility to the hydrophobic liquid, and it contaminates a hydrophobic interlayer of the electrowetting device.

As a result, it has been arrived at the fact that the dispersibility of the hydrophobic liquid in the emulsion may be made suitable for production of an electrowetting device by using a surfactant containing a compound with high hydrophobicity and a non-ionic compound with high hydrophilicity.

The emulsion may be an emulsion described previously, and may be for example an emulsion ink for an electrowetting device, where the first fluid may comprise a hydrophobic liquid, and the second fluid may comprise a hydrophilic liquid.

In a further embodiment, the amount of the non-ionic surfactant is 0.001 to 5% by weight. In another embodiment there is provided an electrowetting device, which is produced by using the emulsion ink for an electrowetting device.

According to a yet further embodiment, there is provided a non-ionic surfactant for an emulsion for an electrowetting device, comprising a compound having a hydrophobic segment and a compound having a hydrophilic segment, the difference between the SP value of the compound having a hydrophobic segment and the SP value of the compound having a hydrophilic segment being 4 or greater. The SP value of the compound having the hydrophobic segment may be 4.5 to 9, or 5 to 8.5, and the SP value of the compound having the hydrophilic segment may be 12 to 15, or 12.5 to 14. Further, the non-ionic surfactant may have a molecular weight of 100 to 3,000, or 250 to 1,000.

According to another embodiment, there is provided a use of a non-ionic surfactant in an emulsion for the manufacture of an electrowetting device, the non-ionic surfactant comprising a compound having a hydrophobic segment and a compound having a hydrophilic segment, the difference between the SP value of the compound having a hydrophobic segment and the SP value of the compound having a hydrophilic segment being 4 or greater.

According to another embodiment, there is provided a method for producing an electrowetting display, comprising:

Step 1 in which a sealant and two substrates having electrodes are prepared and the sealant is applied to one of the substrates to form a seal pattern;

Step 2 in which the one substrate is bonded to the other substrate and the sealant is cured to form a cell having an opening;

Step 3 in which an emulsion is prepared and the emulsion is injected into the cell through the opening; and Step 4 in which the opening is sealed, wherein either one of the two substrates having the electrodes has a hydrophobic interlayer on its surface.

This embodiment may provide a method for producing an electrowetting display that easily produces a high-quality electrowetting display, for example by an injection technique.

It has been found that the method in which an emulsion ink including a hydrophilic liquid and a hydrophobic liquid dispersed in the hydrophilic liquid is injected into a cell leads to high productivity, even dispensing of the emulsion ink per pixel, and inhibition of unevenness. It has also been found that appropriate dispersing conditions enable phase separation of the hydrophilic liquid and the hydrophobic liquid after the production.

The emulsion may be an emulsion described previously, and may for example be an emulsion ink, where the first fluid may comprise a hydrophobic liquid and the second fluid may comprise a hydrophilic liquid, meaning the emulsion ink may contain the hydrophilic liquid and the hydrophobic liquid dispersed in the hydrophilic liquid. The electrodes may be transparent and the applying of the sealant in Step 1 may be to form a frame-shaped seal pattern. In a further embodiment of the method for producing an electrowetting display, the injection of the emulsion ink into the cell in Step 3 is performed under a pressure of 100 to 1000 mmHg. In another embodiment, the injection of the emulsion ink into the cell in Step 3 is performed with a syringe.

Embodiments will now be described in detail.

Figure 2:
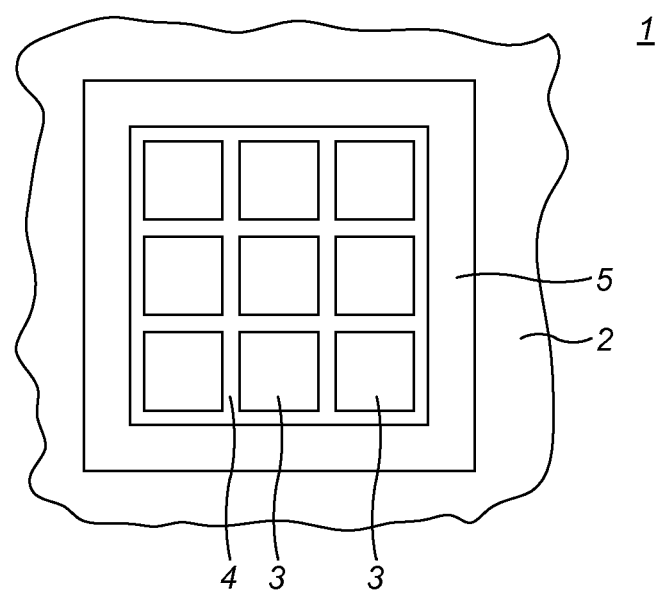
FIG. 2 shows a plan view of the support plate.

FIG. 1 shows a cross-section of a first support plate 1 for use in an electrowetting device. FIG. 2 shows the same support plate in plan view. The electrowetting device uses a first fluid and a second, immiscible fluid. The first fluid may be an oil, such as an alkane; the second fluid may be an electrolyte, for example water. The first fluid may include a coloring substance for providing an optical effect, such as a display effect. The first and/or the second fluid may have a volatility selected to reduce, or minimize, evaporation of the first and/or second fluid during the method of embodiments. The construction and operation of an electrowetting device is disclosed in international patent application WO 03/071346.

The first support plate includes a substrate 2, for example a glass or plastic plate, which is provided with first areas 3 surrounded by second areas 4. The first areas 3 have a higher wettability for the first fluid than for the second fluid. In the embodiment of the figure the first areas are hydrophobic. The second areas 4 have a higher wettability for the second fluid than for the first fluid. In the present embodiment the second areas are hydrophilic. The collection of first areas are enclosed by a sealing member 5, for sealing the second support plate referred to below to the first support plate, where the sealing member 5 may also be hydrophilic. Although all first areas 3 in the figure are enclosed by second areas 4, the sealing member may also form a hydrophilic border of a first area. FIG. 1 shows a second support plate 6 for attachment to the sealing member 5.

The device may include one or more of first areas 3 in the electrowetting device. When the device is a display device, each first area is a display region of a picture element. The hydrophobic layer 3 may be a fluoropolymer layer. The second areas 4 may be hydrophilic areas of a photoresist such as SU8, AZ or BCB, either as level areas or as walls as shown in FIG. 1. The height of the second areas may be 4 micrometer. The height of the sealing member 5 may be as high as 40 micrometer or 75 micrometer. The size of a first area may be 160×160 micrometer. The first support plate may also include electrodes and electronic circuits for controlling voltages on the electrodes, as is common in the art.

Before providing the first and second fluid on the first support plate 1, the first and second fluid are combined into an emulsion. Several methods can be used to make the emulsion. The methods may include use of a capillary channel, a homogenizer, a homomixer, a disperser, a colloid mill, an ultrasonic homogenizer, a milder, an attritor, a high-pressure homogenizer, a nanomiser system, a membrane emulsification device, and a micro bladizer.

In the method utilizing a capillary channel, a mixed solution of the first fluid and the second fluid is sent through a capillary channel having a pinchcock. The method utilizing a capillary channel produces the emulsion continuously.

In the capillary channel method, the mixed solution is dispersed by being sent through the capillary channel. The capillary channel has a constriction generating a large pressure gradient applying sufficient shear force to a solution passing therethrough.

The width of the constriction may be less than 10 micrometer in order to apply sufficient shear force for dispersing the first fluid in the second fluid. The lower limit of the width of the pinchcock portion may be about 2 micrometer.

The diameter of the channel outside the constriction may be less than 0.5 mm. If the diameter of the channel is larger than 0.5 mm, fluid may accumulate at the upstream from the constriction, causing the first fluid not to disperse sufficiently.

The mixed solution is forced through the constriction with a pressure of at least 1 MPa to generate sufficient shearing force on the solution for dispersing the first fluid. The pressure is larger than 10 MPa; the pressure may be lower than 1,000 MPa.

The constriction may have a mechanism for automatically adjusting the width of the channel between 0 micrometer and 10 micrometer according to the pressure, as is known.

Figure 3:
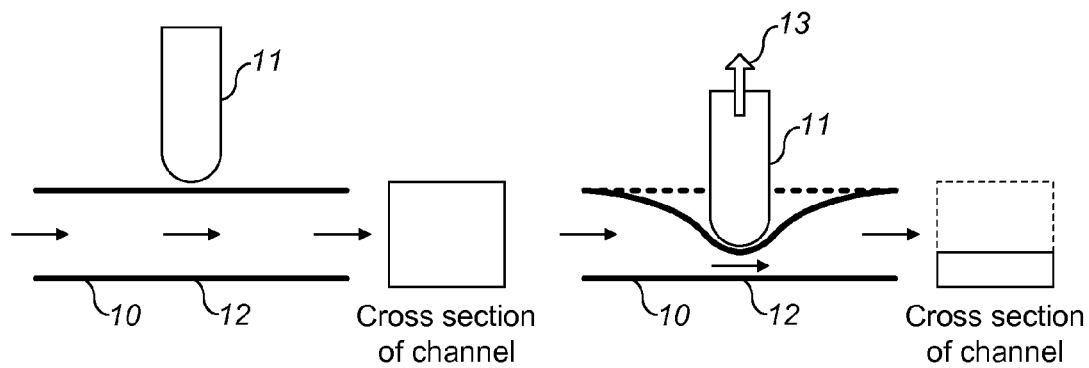
FIG. 3 shows a capillary and an adjustable constriction.
Figure 4A:
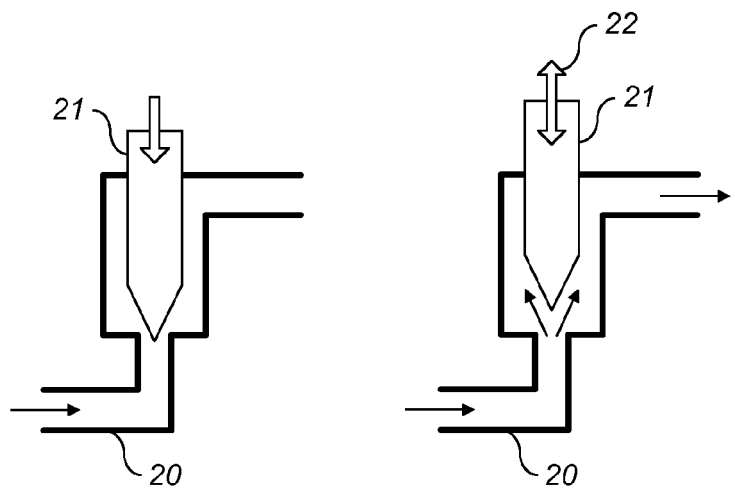
FIGS. 4(a) and (b) show another capillary and adjustable constriction.
Figure 4B:
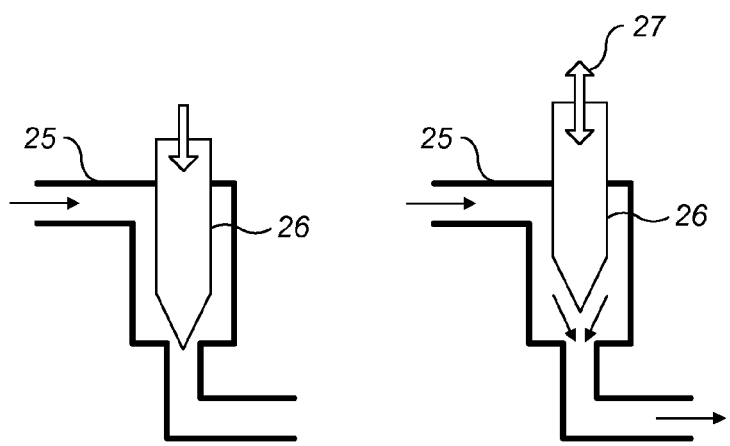

FIGS. 3 and 4 show examples of channels including a constriction having an adjustable width. FIG. 3 shows a flexible channel 10 and an element 11 which can exert a force on the channel to adjust the width of constriction 12. The element 11 may be a ball valve or a diaphragm valve. The left-hand part of the Figure shows the constriction fully open and the right-hand part shows the constriction partly closed. The above mechanism may actuate the element 11 as shown by an arrow 13.

FIGS. 4(a) and (b) show other embodiments of a channel 20, 25 including a constriction in a closed state (left-hand part of figure) and an open state (right-hand part). Both embodiments include a needle valve 21, 26 as constriction. The direction of the flow of the mixed solution is opposite with respect to the needle valve. The position of the needle valve can be controlled by the above mechanism, as indicated by an arrow 22, 27. Examples of commercially available adjustable constriction include "HPB-450" of AKICO Corp. and "26-1700 series" of TESCOM Corp.

Figure 5:
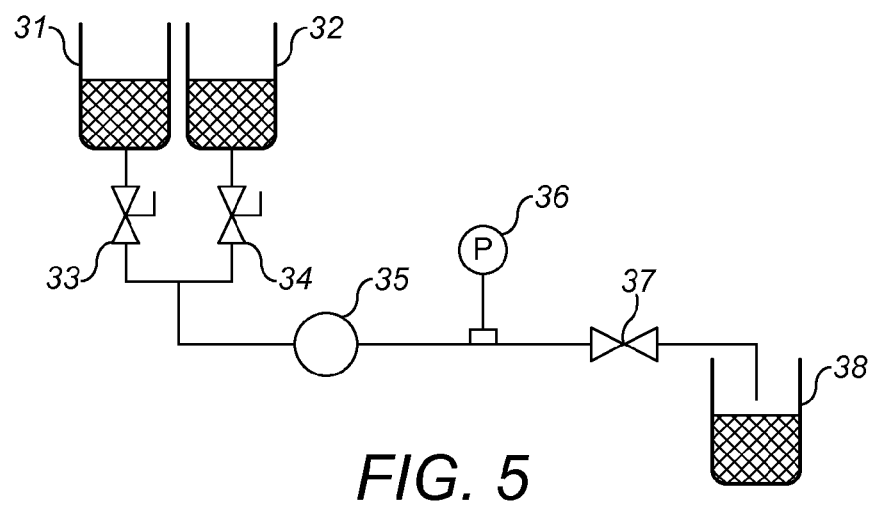
FIG. 5 shows a device for manufacturing an emulsion.

FIG. 5 shows a device for manufacturing an emulsion. A container 31 holds a quantity of the first fluid and a container 32 a quantity of the second fluid. Control valves 33 and 34 control the ratio of first fluid and second fluid in the mixed solution. A pump 35 increases the pressure of the solution; pressure gauge 36 measures the pressure of the solution. The emulsion is formed in constriction 37, which may have the form of embodiments shown in FIGS. 3 and 4. The emulsion is collected in a container 38. All of the examples above can be combined and implemented in an existing dosing apparatus, such as a one-drop-fill equipment that is now used for filling LCDs.

In a first embodiment of the method for making an emulsion, decane (5 parts by weight) and a coloring matter anthraquinone dye (1.75 parts by weight) were uniformly mixed to give a hydrophobic first fluid. The first fluid (5 parts by weight) and the second fluid (the electrolyte, 95 parts by weight) were mixed to yield a mixed solution. The mixed solution was stirred for 10 minutes with an ultrasonic homogenizer of Nippon Seiki Co., Ltd., while being cooled down, to yield an emulsion solution having an average particle size of 5.86 micrometer.

In a second embodiment of the method the mixed solution obtained in the first embodiment was dispersed at a pressure of 3 MPa and a flow rate of 3 ml/min with "HPB-450" of AKICO Corp., resulting in an emulsion having an average particle size of 1.82 micrometer.

The emulsion can be deposited on the support plate 1 shown in FIG. 1 by the so-called one-drop-fill (ODF) technology used in the manufacture of liquid-crystal displays. The ODF technology allows to fill the space on the support plate 1 between the sealing member 5 with an accurate, pre-determined amount of emulsion, such that when sealing of the second support plate 6 with the sealing member 5 the space between the two support plates and the sealing member are filled with the emulsion without air inclusion and without spillage of emulsion outside the sealing member. The ratio of first and second fluid in the emulsion may be such that after the first fluid in the emulsion has coalesced onto the first support plate, a layer of first fluid is formed that has the required thickness. The dosing apparatus may use one or more nozzles for depositing the emulsion on the support plate.

The emulsion may be subject to an ultrasound step either when in the container 38 or when in the space of the support plate to remove any air. The step may be applied before coalescence or thereafter.

The sealing of the first and second support plates 1 and 6 can be carried out using any known method, for example one used in One Drop Fill Technology. Alternatively, the sealing can be carried out as described in international application WO2009/065909, using e.g. pressure-sensitive sealing material.

The time it takes for the first fluid to coalesce into a layer on the first support plate depends on the stability of the emulsion and the difference in wettability of the first surface for the first fluid and the second fluid. The electrowetting device may be turned upside down after filling and sealing to allow the droplets of first fluid to move up towards the first support plate; this will speed up the coalescence if the first fluid is less dense than the second fluid. Alternatively or in addition, a voltage may be applied between the second fluid and an electrode in the first support plate, allowing local control of the rate of phase separation. By controlling the rate of coalescing the first fluid one can control and improve the uniformity of the fill across the device. Further, the support plates, as part of the electrowetting device, may be centrifuged to assist coalescence of the first fluid.

The coalescence may be sped up by adding a substance to the second fluid that increases the interfacial tension between the first fluid and the second fluid. The substance may be added to the emulsion shortly before the dosage of the emulsion on the first support plate or after the dosage.

Figure 6:
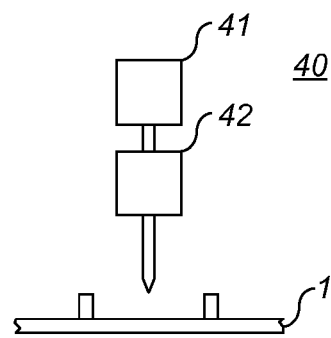
FIG. 6 shows an apparatus for dispensing an emulsion.

The emulsion can have a low stability and, hence, a fast coalescence if the emulsion is prepared immediately before dispensing on the support plate. This can be achieved by arranging the device for making the emulsion, e.g. the channel with constriction, as a unit in the dispensing device, thereby reducing the time between making the emulsion and depositing it. FIG. 6 shows an apparatus 40 for dispensing an emulsion with an integrated emulsion forming unit. The emulsion forming unit 41 may be a device as shown in FIG. 5. The emulsion forming unit may be arranged to form the emulsion with a non-ionic surfactant, for example a non-ionic surfactant described below. The unit 41 may use for example ultrasound or mechanical mixing. The output of the unit 41 is directly connected to a dispensing unit 42, which dispenses the emulsion on the support plate 1.

Alternatively, the emulsion can be stabilized before it is used for dosing by adding an additive to the emulsion that improves the stability of the droplets of the first fluid. This additive may have no effect on the performance of the electrowetting device, also not in the long term. As another embodiment, one can add de-stabilizers to the emulsion after it has been dosed onto the support plate with hydrophobic and hydrophilic areas. The de-stabilizers will either accelerate the phase separation or may even catalyze the phase separation process, and may increase the stability of the display during the lifetime of the electrowetting device as the increased interfacial tension will significantly reduce the chance that parts of the first fluid may move into the second fluid.

Embodiments relating to an emulsion, for example an emulsion ink, will now be described.

According to an embodiment, an emulsion, for example an emulsion ink, for an electrowetting device is formed by dispersing the hydrophobic liquid in the hydrophilic liquid.

The hydrophilic liquid is not particularly limited. Examples thereof include aqueous solutions of electrolytes such as water, potassium chloride, sodium chloride, and lithium chloride; and low molecular weight alcohols such as methyl alcohol, ethyl alcohol, ethylene glycol, and glycerin. Each of these hydrophilic liquids may be used alone, or two or more of these may be used in combination.

The hydrophobic liquid is not particularly limited. Examples thereof include alkanes such as decane, undecane, dodecane, and hexadecane; cycloalkanes; silicone oils; and fluorocarbon. Each of these hydrophobic liquids may be used alone or two or more of these may be used in combination.

The hydrophobic liquid may contain a dye and/or a pigment and is colored thereby.

The dye and the pigment are not particularly limited, and various pigments and dyes may be used such as inorganic ones and organic ones (e.g. phthalocyanine and azo compounds). Here, solutions used for electrowetting are required to have a characteristic of dissolving into a hydrophobic liquid but not dissolving into a hydrophilic liquid; thus, those having a surface that is appropriately subjected to hydrophobic treatment are used for electrowetting.

The amount of the dye and/or the pigment in the hydrophobic liquid is not particularly limited. The lower limit thereof may be 0.5% by weight, and the upper limit thereof may be 20% by weight. If the amount of the dye and/or the pigment is less than 0.5% by weight, the obtained electrowetting display may be poor in contrast, and thus may be poor in display performance. If the amount of the dye and/or the pigment is more than 20% by weight, the solution may have poor fluidity, and thus the driving speed may be slow.

The lower limit of the amount of the dye and/or the pigment may be 1% by weight, and the upper limit thereof may be 10% by weight.

The ratio between the hydrophilic liquid and the hydrophobic liquid in the emulsion ink for an electrowetting device is adjusted depending on a specific application and display parameters such as a pixel resolution and a cell gap. Thereby, the hydrophobic liquid layer of the obtained electrowetting device is formed with a predetermined thickness.

The drop size of the hydrophobic liquid in the emulsion ink is not particularly limited. The lower limit thereof may be 0.05 μm and the upper limit thereof may be 10 μm. If the drop size of the hydrophobic liquid is smaller than 0.05 μm, the adsorptiveness of the hydrophobic areas of the substrate may be poor. In addition, the coloring agent(s) contained in the hydrophobic liquid may be deposited. If the drop size of the hydrophobic liquid is larger than 10 μm, the hydrophobic particles may be phase-separated just after the injection or the bonding, and the hydrophobic liquid may be unevenly adsorbed by the hydrophobic areas of the substrate. The lower limit of the drop size of the hydrophobic liquid may be 1 μm, and the upper limit thereof may be 5 μm.

The CV value of the drops of the hydrophobic liquid in the emulsion ink for an electrowetting device is not particularly limited. The upper limit thereof may be 10%. If the CV value of the drops of the hydrophobic liquid is higher than 10%, the drops may be unevenly adsorbed by the hydrophobic areas of the substrate.

The CV value used herein is defined as $(\sigma/D_n) \times 100$, wherein σ represents the standard deviation of the particle size, and $D_n$ represents the average drop size. The standard deviation and the drop size may be determined by measuring 100 drops with a microscope, or by a dynamic light scattering technique with ZETASIZER Nano series Nano-ZS (Malvern Instruments).

The emulsion ink for an electrowetting device may comprise a non-ionic surfactant including a compound having a hydrophobic segment and a compound having a hydrophilic segment.

As the non-ionic surfactant including a compound having a hydrophobic segment and a compound having a hydrophilic segment is added, the dispersibility of the hydrophobic liquid in the emulsion ink to be obtained is made suitable for production of an electrowetting device.

The target non-ionic surfactant may be produced by light ene/thiol reaction of the compound having a hydrophobic segment and the compound having a hydrophilic segment. In the light ene/thiol reaction, a photo initiator (I.) is irradiated with light and becomes a radical, and this radical extracts hydrogen from a thiol group-containing compound to generate a thiyl radical (RS.) (formulas (1-1) and (1-2)). Then, the generated thiyl radical is reacted with an unsaturated bond-containing compound to generate a radical, and this radical extracts hydrogen from the thiol group-containing compound to provide the target compound (formulas (1-3) and (1-4)).

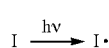 (1-1)

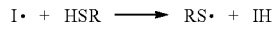 (1-2)

 (1-3)

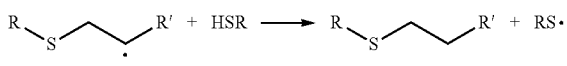 (1-4)

In the case of producing the nonionic surfactant by light ene/thiol reaction, a mixture containing the compound having a hydrophobic segment, the compound having a hydrophilic segment, and a photo initiator is irradiated with light.

One of the compound having a hydrophobic segment and the compound having a hydrophilic segment has only one thiol group or unsaturated bond per molecule, and the other has one or more unsaturated bonds that are reactive with the thiol group of the above compound per molecule or one or more thiol groups that are reactive with the unsaturated bond of the above compound per molecule.

The hydrophobic segment is not particularly limited. Examples thereof include alkyl groups such as an ethyl group, a propyl group, a butyl group, a propyl group, a hexyl group, an octyl group, a decyl group, a lauryl group, a myristyl group, a palmityl group, and a stearyl group, isoalkyl groups, phenyl groups, cycloalkane groups, isoalkyl groups, and fluoroalkyl groups. Here, the unsaturated bond of the compound having a hydrophobic segment and an unsaturated bond in its molecule does not include the hydrophobic segment in its scope.

The compound having a hydrophobic segment and one thiol group per molecule is not particularly limited. Examples thereof include alkyl mercaptans such as butyl mercaptan, propyl mercaptan, hexyl mercaptan, octyl mercaptan, decyl mercaptan, lauryl mercaptan, myristyl mercaptan, palmityl mercaptan, and stearyl mercaptan.

In addition, compounds in which a hydrophobic segment and a thiol group are bonded by chemical bond such as ester bond, amido bond, and urethane bond may be used. Specific examples thereof include octyl thioglycolate, methoxybutyl thioglycolate, octyl mercaptopropyonate, tridecyl mercaptopropyonate, trimethylolpropane tristhiopropyonate, and a 2-mercaptoethyl octanoate ester.

In the case that the compound having a hydrophilic segment has only one unsaturated bond per molecule, the compound having a hydrophobic segment may have two or more thiol groups per molecule. The compound having a hydrophobic segment and two or more thiol groups per molecule is not particularly limited. Examples thereof include butanediol bisthioglycolate, hexanediol bisthioglycolate, butanediol bisthiopropionate, 1,10-decane dithiol, 1,11-undecane bisthiol, 1,12-dodecane bisthiol, 2,2'-dimercaptodiethyl sulfide, p-xylene dithiol, m-xylene dithiol, and thiobenzoic acid.

The compound having a hydrophobic segment and one unsaturated bond per molecule is not particularly limited. Examples thereof include alkyl(meth)acrylates such as ethyl (meth)acrylate, propyl(meth)acrylate, butyl(meth)acrylate, hexyl(meth)acrylate, 2-ethylhexyl(meth)acrylate, octyl (meth)acrylate, isooctyl(meth)acrylate, nonyl(meth)acrylate, isononyl(meth)acrylate, decyl(meth)acrylate, lauryl (meth)acrylate, myristyl(meth)acrylate, palmityl(meth) acrylate, and stearyl(meth)acrylate, and isobornyl(meth) acrylate.

The term "(meth)acrylate" herein means acrylate or methacrylate.

In the case that the compound having a hydrophilic segment has only one thiol group per molecule, the compound having a hydrophobic segment may have two or more unsaturated bonds per molecule. The compound having a hydrophobic segment and two or more unsaturated bonds per molecule is not particularly limited. Examples thereof include 1,9-nonanediyl bis(meth)acrylate, 1,10-decanediyl bis(meth)acrylate, 1,11-undecanediyl bis(meth)acrylate, and 1,12-dodecanediyl bis(meth)acrylate. Examples thereof further include propoxylated ethoxylated bisphenol A di(meth)acrylate, ethoxylated bisphenol A diacrylate, 9,9-bis[4-(2-acryloyloxyethoxy)phenyl]fluorene, propoxylated bisphenol A diacrylate, and tricyclodecanedimethanol diacrylate.

The non-ionic hydrophilic segment is not particularly limited. Examples thereof include a hydroxy group, an amido group, an ether group, an ester group, an acetoxy group, and a hydroxysilyl group.

Here, the hydrophilic segment does not include the thiol group of the compound having a hydrophilic segment and a thiol group.

The compound having a non-ionic hydrophilic segment and one thiol compound per molecule is not particularly limited. Examples thereof include thioglycolic acid, mercaptopropane diol(thioglycerol), thioglycolic acid monoethanol amine, 2-mercaptoethanol, 4-aminotiphenol, and thioglycerol.

In the case that the compound having a hydrophobic segment has only one unsaturated bond per molecule, the compound having a hydrophilic segment may have two or more thiol groups per molecule. The compound having a hydrophilic segment and two or more thiol groups per molecule is not particularly limited. Examples thereof include 2,2'-dithio bisethanol, 2,2'-[2-(dimethylamino)ethyl] iminobis(ethanethiol), and 1,2-bis(methylamino)ethane-1,2-bisthiol.

The compound having a hydrophilic segment and one unsaturated bond per molecule is not particularly limited. Examples thereof include 2,3-dihydroxypropyl(meth)acrylate and glucosyl(meth)acrylate.

In the case that the compound having a hydrophobic segment has only one thiol group per molecule, the compound having a hydrophilic segment may have two or more unsaturated bonds per molecule. The compound having a hydrophilic segment and two or more unsaturated bonds per molecule is not particularly limited. Examples thereof include 2-hydroxy-2-(hydroxymethyl)propane-1,3-diyl bis(meth)acrylate, 1-(1,2-dihydroxyethyl)ethane-1,2-diyl bis(meth)acrylate, 2-hydroxy-3-(hydroxymethyl)propane-1,3-diyl bis(meth)acrylate, 2,3-dihydroxybutane-1,4-diyl bis(meth)acrylate, 1,2-bis(hydroxymethyl)ethylene bis(meth)acrylate, 1,1-bis(hydroxymethyl)ethylene bisacrylate, and diallyl tartrate.

With respect to the SP value of the compound having a hydrophobic segment, the lower limit thereof may be 4.5 or higher and the upper limit thereof may be 9 or lower. If having an SP value of lower than 4.5, the compound having a hydrophobic segment may not be dispersion-mixed with the compound having a hydrophilic segment, and thereby the reaction may not proceed. If having an SP value of higher than 9, the compound having a hydrophobic segment may dissolve in an electrowetting electrolyte, and thereby the display response speed may decrease.

The lower limit of the SP value of the compound having a hydrophobic segment may be 5, and the upper limit thereof may be 8.5.

The SP value used herein means a solubility parameter. The SP value may be calculated from the formula $\delta^2 = \Sigma E / \Sigma V$, wherein $\delta$ represents an SP value, E represents an evaporation energy, and V represents a molar volume.

With respect to the SP value of the compound having a hydrophilic segment, the lower limit thereof may be 12, and the upper limit thereof may be 15. If having an SP value of lower than 12, the compound having a hydrophilic segment may cause low dispersibility of the emulsion ink, and thereby the emulsion ink may be deposited. If having an SP value of higher than 15, the compound having a hydrophilic segment may also cause low dispersibility and the deposition. The lower limit of the SP value of the compound having a hydrophilic segment may be 12.5, and the upper limit thereof may be 14.

The difference between the SP value of the compound having a hydrophobic segment and that of the compound having a hydrophilic segment (hereinafter, also referred to as the "SP value difference") is 4 or greater. If the SP value difference is smaller than 4, the surface activity is deteriorated and the stability as an emulsion is deteriorated, thereby resulting in easy phase separation.

The photo initiator may be a Norrish type I photo initiator. The Norrish type I photo initiator is a compound that generates a radical cleaving a monomolecular bond by light irradiation to trigger the reaction.

The Norrish type I photo initiator is not particularly limited. Examples thereof include benzoin derivatives, methylol benzoin, 4-benzoyl-1,3-dioxolane derivatives, benzyl ketal, α,α-dialkoxyacetophenones, α-hydroxyalkylphenones, α-aminoalkylphenones, acylphosphine oxide, bisacylphosphine oxide, acylphosphine sulfide, and halogenated acetophenone derivatives.

The amount of the photo initiator is not particularly limited. The lower limit thereof may be 0.01 parts by weight for 100 parts by weight in total of the compound having a hydrophobic segment and the compound having a hydrophilic segment, and the upper limit thereof may be 10 parts by weight. If the amount of the photo initiator is smaller than 0.01 parts by weight, the reaction may insufficiently proceed or may too slowly proceed. If the amount of the photo initiator is larger than 10 parts by weight, a large amount of the initiator may remain unreacted or a large amount of sub-products due to decomposition of the initiator may be generated, and they may be deposited as impurities to inhibit the surface activity of the synthesized surfactant.

The lower limit of the amount of the photo initiator may be 0.05 parts by weight, and the upper limit thereof may be 1 part by weight.

In the method for producing the non-ionic surfactant, light for irradiating the mixture containing the compound having a hydrophobic segment, the compound having a hydrophilic segment, and the photo initiator may have a wavelength of 300 to 450 nm and a cumulative light quantity of 50 to 2000 mJ/cm$^2$.

The light source is not particularly limited. Examples thereof include a low-pressure mercury lamp, a medium-pressure mercury lamp, a high-pressure mercury lamp, an ultra high-pressure mercury lamp, an excimer laser, a chemical lamp, a black light lamp, a microwave-excited mercury lamp, a metal halide lamp, a sodium lamp, a halogen lamp, a xenon lamp, a fluorescent lamp, sunlight, and an electron-irradiating device. Each of these light sources may be used alone, or two or more of these may be used in combination. The light source may be appropriately selected depending on the absorbing wavelength of the photo initiator.

The light may be applied by simultaneous irradiation from various light sources, successive irradiation with time difference, or combination of simultaneous and successive irradiation, for example. Any irradiation method may be employed.

The lower limit of the number average molecular weight of the non-ionic surfactant may be 100, and the upper limit thereof may be 3,000. If the number average molecular weight is lower than 100, the surfactant is small in its molecular structure. Thus, the molecular sizes of the hydrophilic group and the hydrophobic group are not enlarged, likely resulting in an insufficiently strong surface activity. If the number average molecular weight is higher than 3,000, the amount of the surfactant added to the emulsion required for exerting the surface activity is too large, and thus the characteristics of the emulsion may be deteriorated. The lower limit of the number average molecular weight may be 250, and the upper limit thereof may be 1,000.

The number average molecular weight herein is a polystyrene-equivalent value obtained by gel permeation chromatography (GPC). The column for measuring the polystyrene-equivalent number average molecular weight by GPC may be Shodex LF-804 (Showa Denko K.K.), for example.

The amount of the non-ionic surfactant in the emulsion ink for an electrowetting device is not particularly limited. The lower limit may be 0.001% by weight, and the upper limit thereof may be 5% by weight. If the amount of the non-ionic surfactant is smaller than 0.001% by weight, the dispersion stability decreases and the emulsion ink is easily phase-separated.

If the amount of the non-ionic surfactant is larger than 5% by weight, the surfactant may contaminate the hydrophobic dielectric layer to cause reduction in the response speed. The lower limit of the amount of the non-ionic surfactant may be 0.01% by weight, and the upper limit may be 1% by weight.

The emulsion ink for an electrowetting device may contain a commercially available non-ionic surfactant.

The emulsion ink for an electrowetting device may be produced by any method. It may be prepared by a method with a capillary channel, a homogenizer, a homomixer, a disperser, a colloid mill, an ultrasonic homogenizer, a milder, an attritor, a (ultra) high-pressure homogenizer, a nanomiser system, a membrane emulsification device, or a micro bladizer, for example.

In the method with a capillary channel, a mixed solution containing the hydrophilic liquid, the hydrophobic liquid, and the non-ionic surfactant is sent through a capillary channel having a pinchcock. The method with a capillary channel is capable of continuously producing the emulsion ink.

In the method with a capillary channel, the mixed solution is made dispersed after sent through the capillary channel. The capillary channel has a constricting portion that generates a large pressure gradient applying sufficient shear force to a solution passing therethrough. The width of the constricting portion may be less than 10 μm in order to apply sufficient shear force for dispersing the hydrophobic liquid in the hydrophilic liquid.

The channel diameter of the capillary channel other than the constricting portion may be less than 0.5 mm. If the channel diameter at the portion other than the constricting portion is 0.5 mm or greater, the hydrophobic liquid may not be sufficiently dispersed.

As the mixed solution is sent through the constricting portion, shearing force with a pressure of at least 1 MPa is applied to the solution, and thereby the hydrophobic liquid is dispersed. The constricting portion may have a mechanism for automatically adjusting the channel width between 0 to 10 μm.

Figure 7:
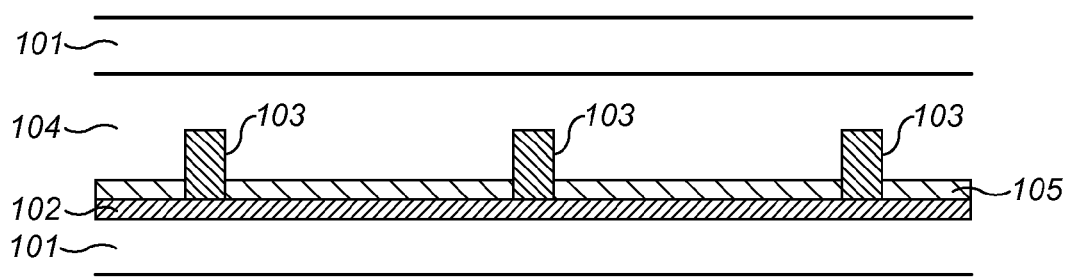
FIG. 7 is a cross-sectional view schematically showing one example of an electrowetting device of an embodiment, which may be produced by a method of an embodiment for producing an electrowetting display of an embodiment.

An electrowetting device produced by using the emulsion ink for an electrowetting device is also one embodiment. FIG. 7 is a cross-sectional view schematically showing one example of the electrowetting device.

The electrowetting device may be produced as follows: one substrate 101 that is made of a substance such as glass or a polymer and that has a hydrophobic interlayer 102 such as a fluoropolymer and on which a pixel wall 103 is prepared; the emulsion ink for an electrowetting device is drop-filled thereinto, and the other substrate is attached to the one substrate. A hydrophobic liquid 105 is stably dispersed in a hydrophilic liquid 104 during the production of the electrowetting device. After the production, the hydrophobic liquid 105 is formed into a layer separate from the hydrophilic liquid 4 and evenly attaches to the hydrophobic interlayer 102 as shown in FIG. 7.

Examples in accordance with embodiments will now be described.

Example 1

A compound having a hydrophobic segment (24.04 parts by weight, "dodecyl acrylate", Wako Pure Chemical Industries, Ltd., SP value: 8.3 (measured by SMALL method)), 3-mercapto-1,2-propanediol (10.82 parts by weight, Wako Pure Chemical Industries, Ltd., SP value: 13.2) as a compound having a hydrophilic segment, and Irgacure 1173 (0.05 parts by weight, BASF) as a photo initiator were mixed together. The obtained mixture was subjected to ultrasonic wave treatment while cooled down, and thereby a dispersant was prepared. This dispersant was irradiated with 365-nm ultraviolet rays at 1 mW/cm² for 30 seconds from a black light lamp. Thereby, a surfactant represented by the following formula (2) (number average molecular weight: 348) was prepared.

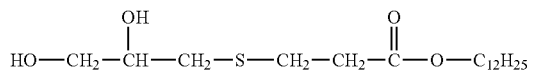

(2)

Ethylene glycol (67% by weight, Wako Pure Chemical Industries, Ltd.) and glycerin (33% by weight) were mixed to give a solution A as a hydrophilic liquid. An anthraquinone pigment (5% by weight) was dissolved into normal decane (Wako Pure Chemical Industries, Ltd.) to give a solution B as a pigment-mixed hydrophobic liquid.

The solution A (19 g) and the solution B (1 g) were put into a sample vial, and the produced non-ionic surfactant (0.1 parts by weight) represented by formula (2) was added thereto. Then, the mixture was shake-stirred. The mixture was subjected to ultrasonic wave treatment with an ultrasonic wave treatment device (Honda Electronics Co., Ltd., "ultrasonic cleaner W-113") for 30 minutes while the sample vial is cooled with ice. Thereby, the hydrophobic liquid and the hydrophilic liquid were evenly mixed to provide an emulsion ink.

The average particle size measured with a granulometer was 1.5 μm.

A solution of fluoropolymer (AF 1601 SOL FC, E. I. du Pont de Nemours and Company) was applied to a transparent electrode to provide a hydrophobic interlayer on a substrate. Bumps each with a 40 μm height were formed on the substrate as hydrophilic pixel walls with a photoresist of SU-8 (Kayaku Microchem Corp.). Thereby, a hydrophobic substrate was prepared.

A photosetting resin was applied onto an ITO glass substrate, which is other substrate than that having the bumps, with a dispenser such that the resin defines a frame shape. Thereby, a seal pattern was formed.

The obtained emulsion ink was drop-wise added onto the ITO glass substrate with the seal pattern formed thereon. Then, the ITO glass substrate with the seal pattern formed thereon and the substrate having the hydrophobic interlayer thereon were bonded to each other via the seal pattern under a pressure of 760 mmHg.

The bonded substrates were irradiated with 1000 mJ light from an ultra high-pressure mercury lamp having a center wavelength of 365 nm, so that the sealant was cured. Thereby, an electrowetting device was produced.

Example 2

Except that 2-ethylhexyl acrylate (Wako Pure Chemical Industries, Ltd., SP value: 8.31) was used as the compound having a hydrophilic segment instead of dodecyl acrylate, a non-ionic surfactant represented by the following formula (3) (number average molecular weight: 292) was prepared in the same manner as in Example 1.

Except that the non-ionic surfactant represented by formula (3) was used instead of the non-ionic surfactant represented by formula (2), an emulsion ink was prepared in the same manner as in Example 1. The average particle size measured with a granulometer was 1.7 μm. Further, an electrowetting device was produced by using the obtained emulsion ink in the same manner as in Example 1.

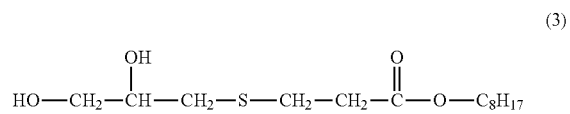

(3)

Example 3

Except that n-butyl acrylate (Wako Pure Chemical Industries, Ltd., SP value: 8.6) was used as the compound having a hydrophobic segment instead of dodecyl acrylate, a non-ionic surfactant represented by the following formula (4) (number average molecular weight: 256) was prepared in the same manner as in Example 1.

Except that the non-ionic surfactant represented by formula (4) was used instead of the non-ionic surfactant represented by formula (2), an emulsion ink was prepared in the same manner as in Example 1. The average particle size measured with a granulometer was 1.9 μm. Further, an electrowetting device was produced by using the obtained emulsion ink in the same manner as in Example 1.

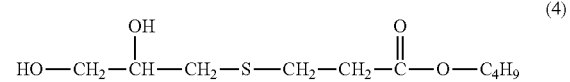

(4)

Comparative Example 1

Except that the non-ionic surfactant represented by formula (2) was not used, an emulsion ink was prepared and an electrowetting device was produced in the same manner as in Example 1.

Comparative Example 2

Except that the non-ionic surfactant represented by formula (2) was not used, an emulsion ink was prepared in the same manner as in Example 1. Except that the emulsion ink was stored at a temperature as low as −15° C. until just before the production, an electrowetting device was produced in the same manner as in Example 1.

Evaluation

The emulsion inks and the electrowetting devices produced in the examples and the comparative examples were evaluated as follows. Table 1 shows the results.

Dispersion Stability

For each of the emulsion inks prepared in the examples and the comparative examples, the time period for phase-separation of the hydrophilic liquid and the hydrophobic liquid from the preparation was measured. The time period for phase separation of 3 hours or longer was evaluated as "◦", and the time period for phase separation of shorter than 3 hours was evaluated as "x".

Unevenness of Hydrophobic Liquid Layer

Each of the electrowetting devices produced in the examples and the comparative examples were visually observed. If the hydrophobic liquid layer was evenly formed, evaluated as "◦◦"; if the layer hardly had unevenness, as "◦"; little unevenness, as "Δ"; and apparent unevenness, as "x".

TABLE 1

|  | Dispersion stability (time for phase separation) | Unevenness in hydrophobic liquid layer |
| --- | --- | --- |
| Example 1 | ◦ (6 hours) | ◦ |
| Example 2 | ◦ (6 hours) | ◦◦ |
| Example 3 | ◦ (3 hours) | ◦ |
| Comparative Example 1 | x (20 minutes) | x |
| Comparative Example 2 | x (1 hour) | Δ |

Embodiments relating to a method of producing an electrowetting display, will now be described.

The method for producing an electrowetting display of the present embodiments comprises Step 1 in which a sealant and two substrates having transparent electrodes may be prepared, and the sealant may be applied to one of the two substrates to form a frame-shaped seal pattern.

The substrate is not particularly limited. Examples thereof include those made of glass and resin, which are used as panel substrates for common display devices.

The transparent electrode is not particularly limited. Examples thereof include those made of tin-doped indium oxide (ITO).

One of the two substrates has a hydrophobic interlayer on the surface. As one of the two substrates having the transparent electrodes has the hydrophobic interlayer on the surface, the hydrophobic liquid is evenly deposited on the hydrophobic interlayer by phase-separation treatment after the production of an electrowetting display.

The hydrophobic interlayer is not particularly limited. Examples thereof include those made of resin having high permittivity and hydrophobicity, such as fluoropolymers, ETFE, and PVDF.

The hydrophobic interlayer may have an area surrounded by pixel walls (bumps). As the emulsion ink contacts the hydrophobic interlayer surrounded by the pixel walls and is treated under appropriate process-environmental conditions, the hydrophobic interlayer area is covered with the hydrophobic liquid layer, and the hydrophilic transparent electrode interface is made adjacent to the hydrophilic liquid.

The sealant may be applied to the substrate having the hydrophobic interlayer on the surface, or may be applied to the substrate not having the hydrophobic interlayer.

The sealant is not particularly limited, and may be a known sealant containing a curable resin.

The curable resin is not particularly limited. Examples thereof include a photosetting resin, a thermosetting resin, and a photothermosetting resin.

Examples of the photosetting resin include radical-polymerizable compounds and cation-polymerizable compounds.

The radical-polymerizable compound is not particularly limited. It may be a compound having an unsaturated double bond. It may be a compound having a (meth)acryloyloxy group because of its excellent reactivity.

The term "(meth)acryloyloxy group" herein means an acryloyloxy group or a methacryloyloxy group.

In the case of containing the radical-polymerizable compound, the sealant may further contain a photo radical polymerization initiator.

The photo radical polymerization initiator is not particularly limited. Examples thereof include benzophenone compounds, acetophenone compounds, acylphosphine oxide compounds, titanocene compounds, oxime ester compounds, benzoin ether compounds, benzyl, and thioxanthone.

The cation-polymerizable compound is not particularly limited. Suitably used are compounds such as epoxy group-containing compounds and oxetanyl group-containing compounds.

In the case of containing the cation-polymerizable compound, the sealant may further contain a photo cation polymerization initiator.

The photo cation polymerization initiator is not particularly limited. Examples thereof include aromatic diazonium salts, aromatic iodonium salts, and aromatic sulfonium salts.

The thermosetting resin is not particularly limited. Examples thereof include epoxy group-containing compounds and oxetanyl group-containing compounds.

In the case of containing the thermosetting resin, the sealant may further contain a thermosetting agent.

The thermosetting agent is not particularly limited. Examples thereof include organic acid hydrazide, imidazole derivatives, amine compounds, polyphenol compounds, and acid anhydrides.

The photothermosetting resin is a compound having a photosetting functional group and a thermosetting functional group per molecule. Examples of such a compound include a compound having one or more epoxy groups and one or more (meth)acryloyloxy groups per molecule.

In the case of containing the photothermosetting resin such as a compound having one or more epoxy groups and one or more (meth)acryloyloxy groups per molecule, the sealant may further contain the aforementioned photo radical polymerization initiator and thermosetting agent.

The sealant may be applied to the substrate by any method, and may be applied by a known method with a dispenser.

The aforementioned frame-shaped seal pattern may be prepared by forming an opening for emulsion ink injection in Step 3.

The method for producing an electrowetting display of the present embodiments comprises Step 2 in which the one substrate and the other substrate are bonded to each other, the sealant is cured, and thereby a cell having an opening is produced.

The sealant may be cured by a method of applying light and/or a method of heating depending on the type of the curable resin in the sealant.

The opening may be formed upon preparing a seal pattern in Step 1 as mentioned above, or may be formed after the sealant is cured.

In addition, the cell may have only one opening, or may have two or more openings.

The method for producing an electrowetting display of the present embodiments comprises Step 3 in which the emulsion ink including the hydrophilic liquid and the hydrophobic liquid dispersed in the hydrophilic liquid is injected into the cell through the opening.

The hydrophilic liquid is not particularly limited. Examples thereof include aqueous solutions of electrolytes such as water, potassium chloride, sodium chloride, and lithium chloride; and low molecular weight alcohols such as methyl alcohol, ethyl alcohol, ethylene glycol, and glycerin. Each of these hydrophilic liquids may be used alone, or two or more of these may be used in combination.

The hydrophobic liquid is not particularly limited. Examples thereof include alkanes such as decane, undecane, dodecane, and hexadecane; silicone oils; and fluorocarbon. Each of these hydrophobic liquids may be used alone or two or more of these may be used in combination.

The hydrophobic liquid may contain a dye and/or a pigment and be colored thereby.

The dye and the pigment are not particularly limited, and various pigments and dyes may be used such as inorganic ones and organic ones (e.g. phthalocyanine and azo compounds). Here, solutions used for electrowetting are required to have a characteristic of dissolving into a hydrophobic liquid but not dissolving into a hydrophilic liquid; thus, those having a surface that is appropriately subjected to hydrophobic treatment are used for electrowetting.

The amount of the dye and/or the pigment in the hydrophobic liquid is not particularly limited. The lower limit thereof may be 0.5% by weight, and the upper limit thereof may be 20% by weight. If the amount of the dye and/or the pigment is less than 0.5% by weight, the obtained electrowetting display may be poor in contrast, and thus may be poor in display performance. If the amount of the dye and/or the pigment is more than 20% by weight, the solution may have poor fluidity, and thus the obtained electrowetting display may drive slowly.

The lower limit of the amount of the dye and/or the pigment may be 1% by weight, and the upper limit thereof may be 10% by weight.

The ratio between the hydrophilic liquid and the hydrophobic liquid in the emulsion ink is adjusted depending on a specific application and display parameters such as a pixel resolution and a cell gap. Thereby, the hydrophobic liquid layer of the obtained electrowetting display is formed with a predetermined thickness.

The drop size of the hydrophobic liquid in the emulsion ink is not particularly limited. The lower limit thereof may be 0.05 μm and the upper limit thereof may be 10 μm. If the drop size of the hydrophobic liquid is smaller than 0.05 μm, the adhesiveness to the hydrophobic areas of the substrate may be poor. In addition, the dye and/or the pigment contained in the hydrophobic liquid may be deposited. If the drop size of the hydrophobic liquid is larger than 10 μm, the hydrophobic liquid may be phase-separated just after the injection, and the hydrophobic liquid may unevenly attach to the hydrophobic areas of the substrate. The lower limit of the drop size of the hydrophobic liquid may be 1 μm, and the upper limit thereof may be 5 μm.

The CV value of the drops of the hydrophobic liquid in the emulsion ink is not particularly limited. The upper limit thereof may be 10%. If the CV value of the drops of the hydrophobic liquid is higher than 10%, the drops may unevenly attach to the hydrophobic areas of the substrate.

The CV value used herein is defined as $(\sigma/D_n) \times 100$, wherein $\sigma$ represents the standard deviation of the particle size, and $D_n$ represents the average drop size. The standard deviation and the drop size may be determined by measuring 100 drops with a microscope, or by a dynamic light scattering technique with ZETASIZER Nano series Nano-ZS (Malvern Instruments).

The emulsion ink may further contain a non-ionic surfactant, since ionic surfactants inhibit formation of an electric double layer.

The emulsion ink may be prepared immediately before the injection into a cell. In the case that the emulsion is prepared immediately before the injection into a cell, the emulsion may not be required to endure long-term storage. The shorter the stable time period of the emulsion is, the easier the phase separation occurs after the production of an electrowetting display. In other words, the hydrophobic liquid is likely to attach to the interface of the hydrophobic interlayer. On the other hand, if the stable time period is too long, the hydrophobic liquid requires too long a time for attaching to the interface of the hydrophobic interlayer in the post phase separation. Thus, the productivity may be deteriorated, and the dye and/or the pigment contained in the hydrophobic fluid may be deposited in the separation step.

In the case that the emulsion is prepared immediately before the injection into a cell, the hydrophobic liquid and the hydrophilic liquid may be stored separately.

The emulsion ink may be prepared by any method. It may be prepared by a method with a capillary channel, a homogenizer, a homomixer, a disperser, a colloid mill, an ultrasonic homogenizer, a milder, an attritor, a (ultra) high-pressure homogenizer, a nanomiser system, a membrane emulsification device, or a micro bladizer, for example.

In the method with a capillary channel, a mixed solution containing the hydrophilic liquid, the hydrophobic liquid, and additives such as a surfactant is sent through a capillary channel having a pinchcock. The method with a capillary channel is capable of continuously producing the emulsion ink.

In the method with a capillary channel, the hydrophobic liquid is made dispersed in the hydrophilic liquid after the mixed solution is sent through the capillary channel. The capillary channel has a constricting portion that generates a large pressure gradient applying sufficient shear force to a solution passing therethrough. The width of the constricting portion may be less than 10 μm in order to apply sufficient shear force for dispersing the hydrophobic liquid in the hydrophilic liquid.

The channel diameter of the capillary channel other than the constricting portion may be less than 0.5 mm. If the channel diameter at the portion other than the constricting portion is 0.5 mm or greater, the hydrophobic liquid may not be sufficiently dispersed.

As the mixed solution is sent through the constricting portion, shearing force with a pressure of at least 1 MPa is applied to the solution, and thereby the hydrophobic liquid is dispersed. The constricting portion may have a mechanism for automatically adjusting the channel width between 0 to 10 μm.

The lower limit of the pressure upon injecting the emulsion ink into a cell may be 100 mmHg, and the upper limit thereof may be 1000 mmHg. If the emulsion ink is injected with a pressure lower than 100 mmHg, the hydrophobic liquid may be volatilized and the concentration of the emulsion ink may be changed. If the emulsion ink is injected with a pressure higher than 1000 mmHg, the solution may be rapidly injected and bubbles may be likely to remain in the bump.

The lower limit of the pressure upon injecting the emulsion ink may be 200 mmHg, and the upper limit thereof may be 800 mmHg.

Injection of the emulsion ink may be performed with a syringe. In particular, the syringe may be made of a material that has a medium-polar surface energy with higher hydrophobicity than the hydrophilic liquid used and with higher hydrophilicity than the hydrophobic liquid used. A syringe having a surface with extremely high hydrophilicity has so high an affinity with the hydrophilic liquid in the emulsion that it induces phase separation.

In contrast, a syringe having a surface with extremely high hydrophobicity adsorbs the hydrophobic liquid, so that the syringe induces phase separation therein.

When a voltage is applied between the emulsion ink and the transparent electrode, the hydrophilic liquid is attracted to the substrate that has a surface without a hydrophobic interlayer. Thereby, the attachment of the hydrophobic liquid to the hydrophobic interlayer is controlled.

In the case of applying a voltage between the emulsion ink and the transparent electrode, the voltage value may be determined depending on the amount of the hydrophobic liquid attaching to the hydrophobic interlayer. The amount of the hydrophobic liquid attaching to the hydrophobic interlayer may be optically measured; for example, it may be determined by measuring the absorbance of the hydrophobic liquid layer by reflection or transmission. Alternatively, the amount of the hydrophobic liquid attaching to the hydrophobic interlayer may be electrically measured; for example, the capacitance between the transparent electrode disposed on the substrate having the hydrophobic interlayer and the hydrophilic liquid is measured. The attachment of the drops of the hydrophobic liquid is capable of being controlled locally or on the whole depending on the obtained value.

During or after the injection of the emulsion ink, bubbles are generated on the substrate or in the emulsion ink in some cases. The bubbles may be removed by applying ultrasonic waves to the hydrophilic liquid and the hydrophobic liquid. The ultrasonic waves may be applied in a controlled manner to the emulsion ink before the hydrophilic liquid and the hydrophobic liquid are separated into the layers, or may be applied to the layers of the hydrophilic liquid and the hydrophobic liquid after separation.

The method for producing an electrowetting display comprises Step 4 in which the opening is sealed.

The opening may be sealed by any method. Examples of the sealing method include a method in which the same sealant as used in the aforementioned Step 1 is cured in the opening to seal the opening.

FIG. 7 is a cross-sectional view schematically showing one example of the electrowetting display produced by the method for producing an electrowetting display of the present embodiments.

In the electrowetting display, a hydrophobic liquid 105 is stably dispersed in a hydrophilic liquid 104 during the production of the electrowetting device. After the production, the hydrophobic liquid 105 is separated from the hydrophilic liquid 104 and evenly attaches to a hydrophobic interlayer 102 as shown in FIG. 7.

The time the hydrophobic liquid requires for evenly attaching to the hydrophobic interlayer to form a layer separated from the hydrophilic liquid depends on the stability of the emulsion and the difference between the wettability of the surface of the hydrophobic interlayer to the hydrophobic liquid and that to the hydrophilic liquid.

In the case that the density of the hydrophobic liquid is smaller than that of the hydrophilic liquid, the attachment of the hydrophobic liquid in the emulsion ink to the hydrophobic interlayer is promoted by centrifugation with the side of the hydrophobic interlayer placed inside. Alternatively, the phase separation rate may be locally controlled by applying a voltage between the hydrophilic liquid and the electrode in the substrate having the hydrophobic interlayer on the surface. A more even hydrophobic liquid layer is formed by controlling the attachment of the hydrophobic liquid to the substrate having the hydrophobic interlayer.

Examples in accordance with embodiments will now be described.

Example 1

A solution of fluoropolymer (AF1601 SOL FC, E. I. du Pont de Nemours and Company) was applied to a transparent electrode to provide a substrate having a hydrophobic interlayer. Bumps each with a 40 μm height were formed on the substrate as hydrophilic pixel walls with a photoresist of SU-8 (Kayaku Microchem Corp.) A photosetting resin A785 (Sekisui Chemical Co., Ltd.) was prepared as a sealant, and was applied to the substrate having the hydrophobic interlayer with a dispenser such that the sealant defined a frame shape to form a seal pattern. Then, an opening was formed in the seal pattern. The other ITO glass substrate not having a hydrophobic interlayer nor hydrophilic pixel walls was placed thereon. The sealant was irradiated with 1000 mJ light from an ultra high-pressure mercury lamp having a center wavelength of 365 nm, so that the sealant was cured. Thereby, a cell having an opening was prepared.

Ethylene glycol (Wako Pure Chemical Industries, Ltd., 67% by weight) and glycerin (33% by weight) were mixed to give a solution A as a hydrophilic liquid. An anthraquinone pigment (5% by weight) was dissolved into normal decane (Wako Pure Chemical Industries, Ltd.) to give a solution B as a pigment-mixed hydrophobic liquid.

The solution A (19 g) and the solution B (1 g) were put into a sample vial, and were shake-stirred. Then, the sample vial was subjected to ultrasonic wave treatment with an ultrasonic wave treatment device (Honda Electronics Co., Ltd., "ultrasonic cleaner W-113") for 30 minutes while being cooled with ice. Thereby, the hydrophobic liquid and the hydrophilic liquid were evenly mixed to provide an emulsion ink.

The center particle size and the zeta potential each measured with a granulometer were 2.43 μm and −5.92 mV, respectively.

The obtained emulsion ink was filled through the opening into the prepared cell with a hydrophobic syringe under a pressure of 760 mmHg. Then, a sealant was applied to the opening, and was cured by light irradiation from an ultra high-pressure mercury lamp to seal the opening. Thereby, an electrowetting display is produced.

Microscope observation showed that the hydrophobic drops were evenly mixed in the obtained electrowetting display. As a pulse voltage of 0 V/100 V was applied to the bonded two substrates at a frequency of 50 Hz, the hydrophobic particles were coagulated to coalesce. Thus, a pulse voltage of 0 V/100 V was applied for 10 seconds at a frequency of 1,000 Hz. In this case, the hydrophobic particles were attracted to the hydrophobic interlayer.

As a pulse voltage of 0 V/20 V was applied at a frequency of 30 Hz, the shape of the interface between the hydrophobic liquid and the hydrophilic liquid changed depending on an increase and decrease of the voltage, and thus opening and closing actions of the pixel areas were observed.

Comparative Example 1

The electrowetting display was produced in the same manner as in Example 1 except that the mixture of the solution A and the solution B was not subjected to ultrasonic wave dispersion and was not formed into an emulsion ink.

Microscope observation of the obtained electrowetting display showed that the hydrophobic interlayer had areas where a large amount of the hydrophobic liquid was attracted and areas where the hydrophobic liquid was hardly attracted.

The above embodiments are to be understood as illustrative examples. Further embodiments are envisaged. For example, the electrowetting device may be a lens or a diaphragm. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. A method of providing a first fluid layer of a first fluid and a second fluid layer of a second fluid, the first fluid immiscible with the second fluid, the method comprising:
   providing an emulsion of the first fluid and the second fluid through a medium which does not comprise the second fluid, the emulsion comprising an amount of the second fluid for forming the second fluid layer;
   the emulsion contacting a first area of a support plate for an electrowetting device, the first area having a higher wettability for the first fluid than for the second fluid; and
   the first fluid of the emulsion coalescing to form the first fluid layer on the first area such that the first fluid layer is formed less than: 20 minutes, 1 hour, 3 hours or 6 hours after the emulsion contacting the first area of the support plate.

2. The method according to claim 1, the second fluid, upon the first fluid of the emulsion coalescing, separating from the first fluid and forming the second fluid layer.

3. The method according to claim 1, the providing the emulsion comprising dispensing the emulsion from a dispenser and through the medium from the dispenser to the first area.

4. The method according to claim 1, wherein the medium is a gaseous medium.

5. The method according to claim 1, the providing the emulsion comprising providing the emulsion as a drop from an opening of a dispenser.

6. The method according to claim 5, wherein the method of providing the first fluid layer and the second fluid layer is a one drop fill method.

7. The method according to claim 1, the support plate being a first support plate, the method comprising:
providing a second support plate; and
coupling the second support plate to the first support plate to form a space between the first support plate and the second support plate, the space comprising the first fluid and the second fluid, the providing the emulsion comprising providing an amount of the emulsion substantially equal to a volume of the space.

8. The method according to claim 7, the amount of the second fluid being a second amount, the first fluid layer comprising a first volume of the first fluid and the second fluid layer comprising a second volume of the second fluid, a first amount of the first fluid and the second amount in the emulsion being substantially equal, respectively, to the first volume and the second volume.

9. The method according to claim 7, the coupling comprising sealing the first support plate to the second support plate with a sealing member.

10. The method according to claim 9, comprising providing the sealing member on the first support plate before the emulsion contacting the first area.

11. The method according to claim 9, comprising:
forming the space with an opening in one or more of: the sealing member, the first support plate or the second support plate;
the providing the emulsion comprising filling the space with the emulsion through the opening after the forming the space; and
closing the opening.

12. The method according to claim 7, comprising performing the coupling after the emulsion contacting the first area.

13. The method according to claim 1, the support plate being a first support plate, the method comprising:
preparing a sealing member;
applying the sealing member to one of the first support plate or a second support plate to form a seal pattern, one of the first support plate or the second support plate having electrodes and a surface with a hydrophobic interlayer thereon;
bonding the first support plate to the second support plate;
curing the sealing member to form a cell having an opening;
the providing the emulsion comprising preparing and injecting the emulsion into the cell through the opening; and
sealing the opening.

14. The method according to claim 13, wherein the emulsion is an emulsion ink, the first fluid comprises a hydrophobic liquid and the second fluid comprises a hydrophilic liquid, the emulsion ink comprising the hydrophilic liquid and the hydrophobic liquid dispersed in the hydrophilic liquid, the electrodes being transparent and the applying the sealing member to the one of the first support plate or the second support plate being to form a frame-shaped seal pattern.

15. The method according to claim 13, wherein the injecting is performed using one or more of: a pressure between 100 and 1000 mmHg or a syringe.

16. The method according to claim 1, wherein the first area is surrounded by a second area having a higher wettability for the second fluid than for the first fluid, the emulsion comprising a portion of the second fluid which separates from the first fluid upon the coalescing and adjoins the second area.

17. The method according to claim 1, wherein the support plate comprises a plurality of first areas, the plurality of first areas comprising the first area, and a plurality of electrodes, a respective electrode of the plurality of electrodes arranged within each of the plurality of first areas, and the second fluid is an electrolyte, the method comprising controlling the coalescing of the first fluid by applying a voltage between the emulsion and at least one electrode of the plurality of electrodes.

18. The method according to claim 1, the second fluid comprising one or more of:
a compound for increasing interfacial tension between the first fluid and the second fluid, or
a salt for increasing interfacial tension between the first fluid and the second fluid.

19. The method according to claim 1, wherein in the emulsion the first fluid is dispersed as droplets in the second fluid.

20. The method according to claim 1, wherein the emulsion comprises a continuous body of the second fluid surrounding a plurality of discrete bodies of the first fluid, wherein upon the coalescing the plurality of discrete bodies of the first fluid together form a continuous body of the first fluid, thereby forming the first fluid layer of the first fluid.

21. The method according to claim 1, wherein the emulsion is below the first area of the support plate during at least part of the coalescing of the first fluid of the emulsion.

22. The method according to claim 1, the support plate being a first support plate, the method comprising:
providing a second support plate;
sealing the second support plate to the first support plate to form a space between the first support plate and the second support plate, the space comprising the first fluid and the second fluid; and
rotating an orientation of the first support plate and the second support plate after the sealing the second support plate to the first support plate.

23. The method according to claim 1, wherein the first fluid is hydrophobic and the second fluid is hydrophilic, and in the emulsion the first fluid is dispersed in the second fluid, the first fluid having one or more of:
a droplet size of between 0.05 micrometers and 10 micrometers, or
a Coefficient of Variation (CV) value of 10% or less.

24. The method according to claim 1, wherein the emulsion comprises a non-ionic surfactant comprising a first compound having a non-polar segment and a second compound having a polar segment, a difference between a first solubility parameter (SP) value of the first compound and a second solubility parameter (SP) value of the second compound being 4 or greater.

25. The method according to claim 1, comprising preparing the emulsion less than: 5 minutes, 15 minutes, or 30 minutes before the providing the emulsion.

26. The method according to claim 1, wherein the medium is substantially a vacuum.

* * * * *